United States Patent
Endo

(10) Patent No.: US 7,047,321 B1
(45) Date of Patent: May 16, 2006

(54) UNBLOCKING AN OPERATING SYSTEM THREAD FOR MANAGING INPUT/OUTPUT REQUESTS TO HARDWARE DEVICES

(75) Inventor: Yasuhiro Endo, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 370 days.

(21) Appl. No.: 10/228,523

(22) Filed: Aug. 26, 2002

(51) Int. Cl.
*G06F 3/00* (2006.01)

(52) U.S. Cl. .......................................... 710/6; 707/200

(58) Field of Classification Search ................ 707/10, 707/100, 200, 205; 710/6, 39, 260, 263
See application file for complete search history.

(56) References Cited

U.S. PATENT DOCUMENTS

| 6,687,764 B1* | 2/2004 | Sonoda et al. ................. 710/6 |
| 2002/0133491 A1* | 9/2002 | Sim et al. ...................... 707/10 |
| 2003/0033308 A1* | 2/2003 | Patel et al. .................... 707/10 |

* cited by examiner

*Primary Examiner*—Tim Vo
*Assistant Examiner*—Clifford Knoll
(74) *Attorney, Agent, or Firm*—Blakely, Sokoloff, Taylor & Zafman LLP

(57) ABSTRACT

The invention provides a method and a system for handling interrupts. The method comprises analyzing a request from an application program to an operating system to determine a control condition for a thread created by the operating system to service the requests; and preventing an interrupt from unblocking the thread unless the interrupt satisfies the control condition.

21 Claims, 8 Drawing Sheets

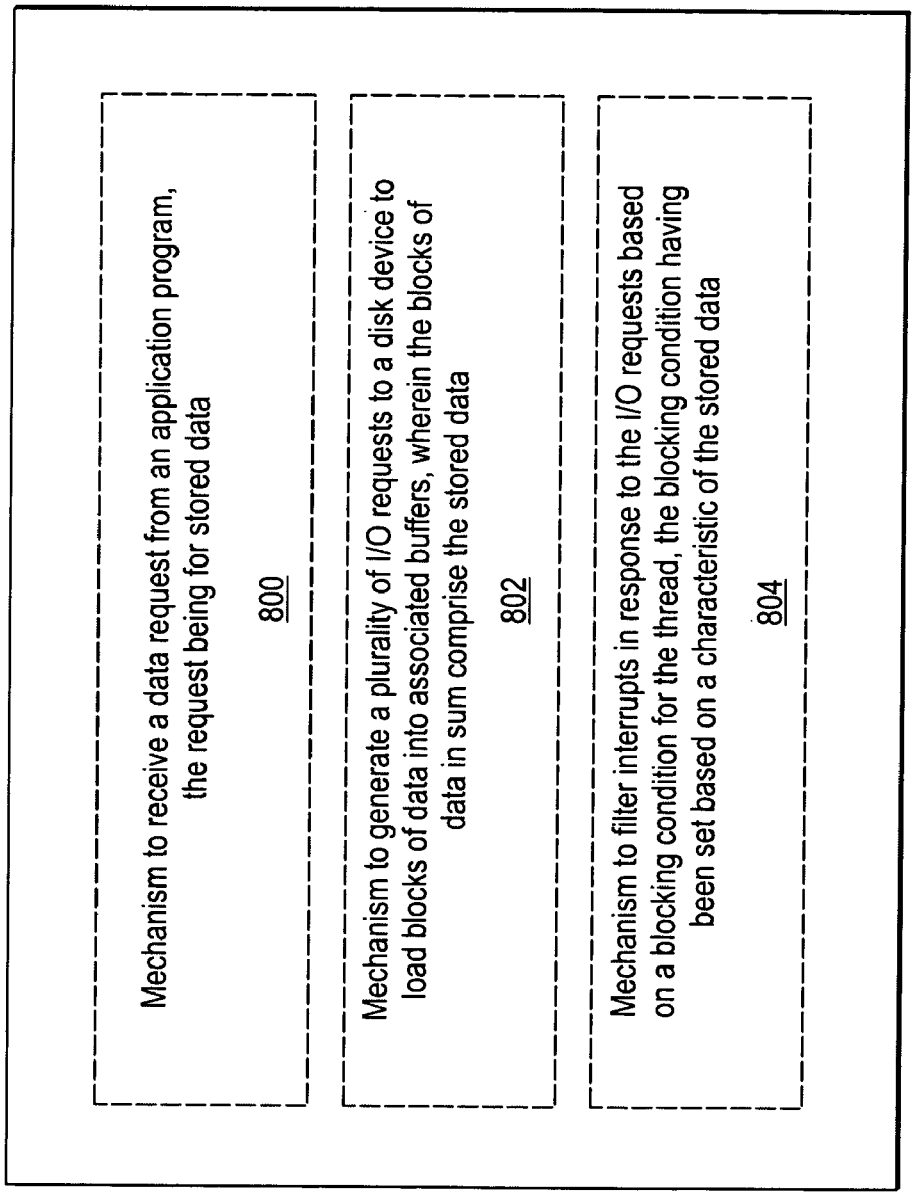

2

UNBLOCKING AN OPERATING SYSTEM THREAD FOR MANAGING INPUT/OUTPUT REQUESTS TO HARDWARE DEVICES

FIELD OF THE INVENTION

This invention relates to operating systems. In particular, it relates to handling interrupts generated by a hardware device to an operating system.

BACKGROUND

An operating system defines an interface between an application program and a hardware platform running the application program. As such, the operating system performs many functions on behalf of the application program. One of these functions may include servicing a request from the application program for stored data, such as a data file. Most operating systems handle such a request by generating multiple input/output (I/O) requests to hardware devices, e.g. a disk drive, to load data blocks comprising the stored data into a memory space. These multiple I/O requests are managed by a thread initialized by the operating system.

In order to maximize the amount of useful work that is done, the operating system puts threads to sleep i.e. stops executing the threads, by blocking. Basically, blocking causes a thread which is unable to run for some reason, such as when it needs resources that are temporarily unavailable, to stop executing or go to "sleep". When a thread blocks, its local data (stacks) and its current position in its program (program counter) are saved so the thread can resume execution later. A blocked thread becomes ready for execution when the condition that has been blocking it changes, allowing the thread to unblock. The thread is thus able to continue executing its program where it left off.

In the case of the multiple I/O requests described above, when one of the I/O requests completes, the request unblocks the thread by generating an interrupt to the operating system. The operating system then continues executing the thread. However, all data needed to complete executing the thread may not be available. For example, some of the I/O requests may still be loading data blocks into the memory space. As a result, the thread is unable to complete execution and will have to be blocked again.

Unblocking a thread is an "expensive" operation from a performance standpoint, since usually many lines of code have to be executed, registers need to be refreshed, etc.

Thus, there is a need to ensure that when an operating system thread is unblocked, all data needed to complete execution of the threads are available.

BRIEF DESCRIPTION OF THE DRAWINGS

FIG. 8 shows a block diagram of an operating system in accordance of one embodiment of the invention.

SUMMARY OF THE INVENTION

In one embodiment, the invention provides a method for handling interrupts. The method comprises analyzing a request from an application program to an operating system to determine a control condition for a thread created by the operating system to service the request; and preventing an interrupt from unblocking the thread unless the interrupt satisfies the control condition.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" or other similar language mean that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a technique for handling interrupts characterized in that an interrupt generated by a hardware device is prevented from unblocking an operating system thread unless the interrupt satisfies a control condition. The control condition is selected so that it maximizes the chances that the operating system is able to perform useful work once the thread is unblocked.

For the purposes of the following description, in order to facilitate greater understanding, aspects of the invention will be described with reference to interrupts generated in response to disk input/output (I/O) requests. However, one skilled in the art will appreciate that the description of aspects of the present invention with respect to such interrupts is intended to be non-limiting.

Figure 1:
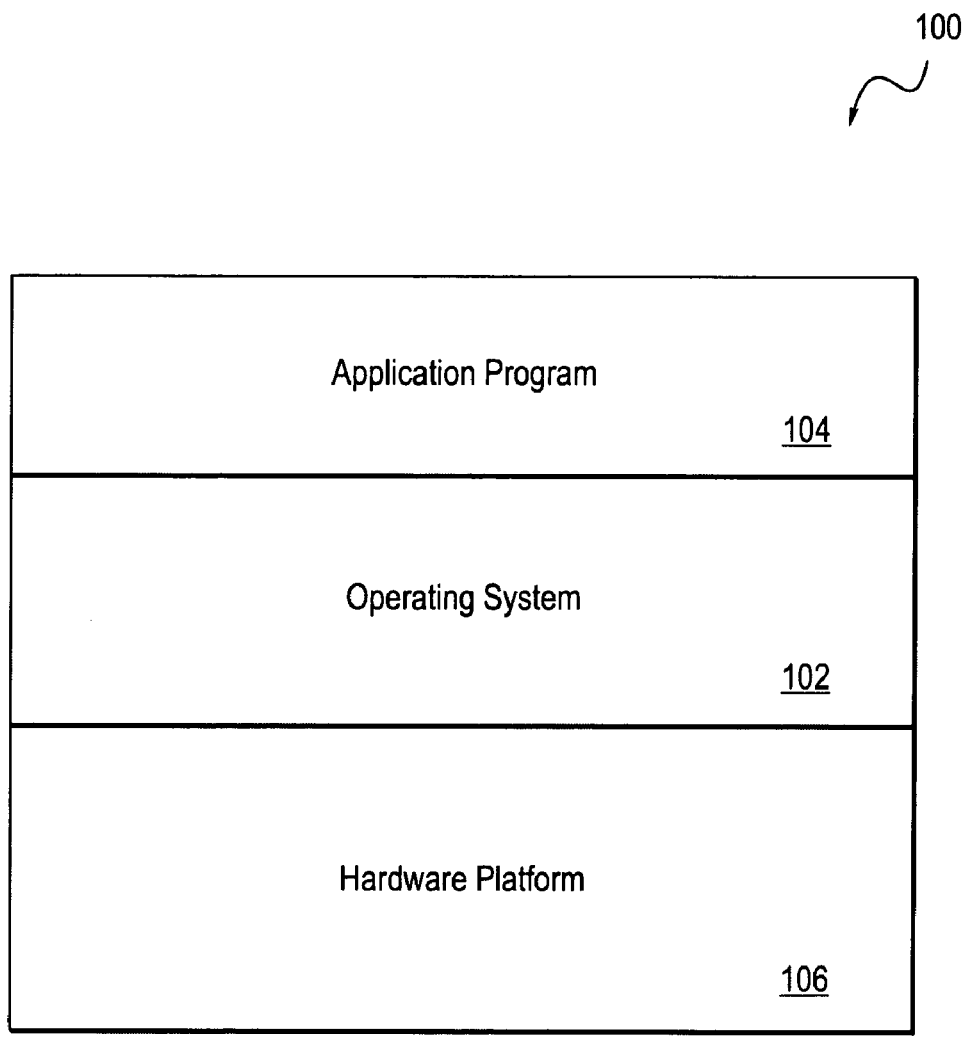
FIG. 1 shows the organization of a typical computer system.

FIG. 1 of the drawings shows the organization of a typical computer system 100. Referring to FIG. 1, the system 100 includes an operating system 102 which defines an interface between an application program 104 and a hardware platform 106. One of the functions of the operating system 102 is to handle I/O requests, for example, a request to read data from a disk forming part of the hardware platform 106, on behalf of the application program 104.

Figure 2:
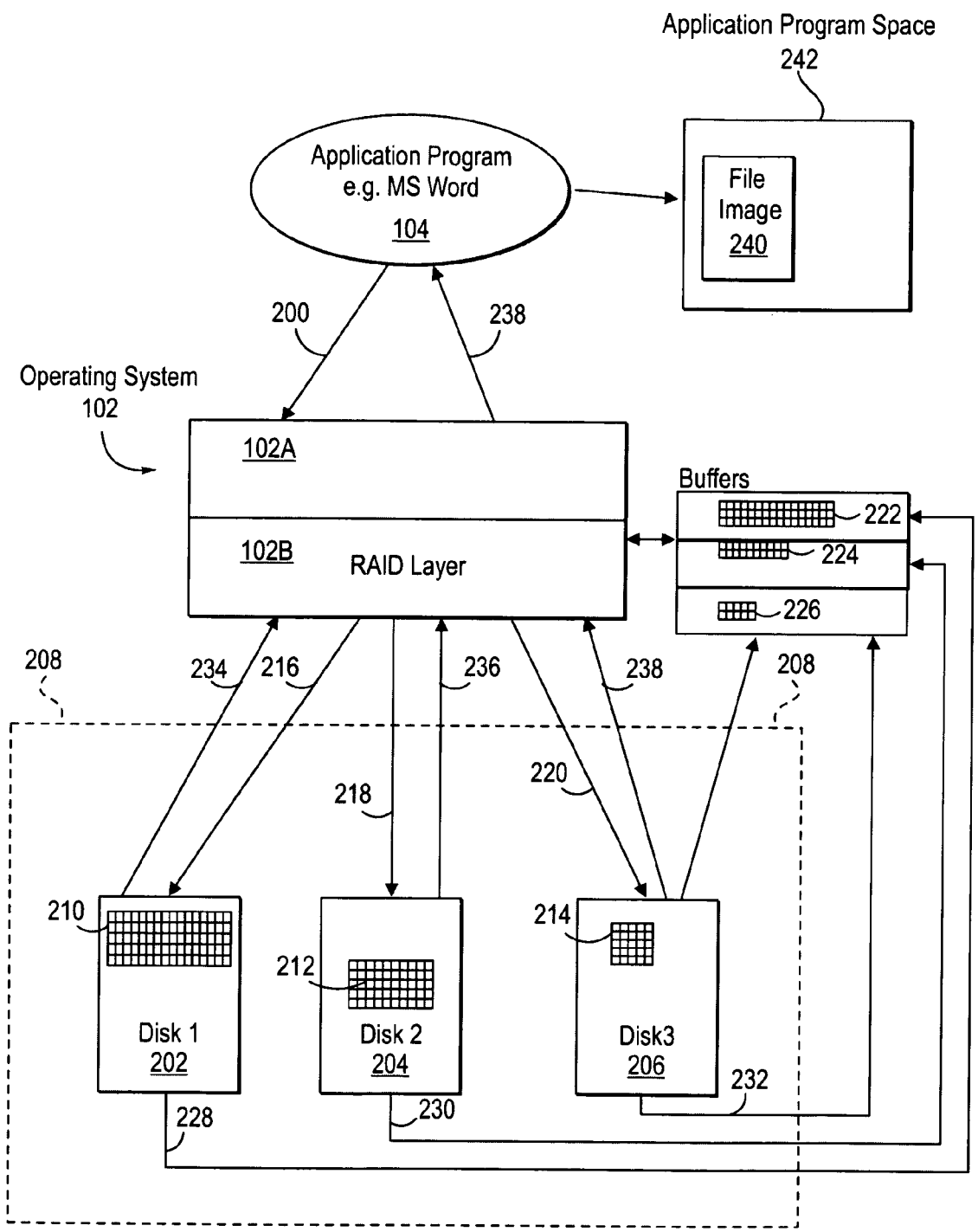
FIG. 2 shows a sequence of operations (or actions) that occurs when an application program sends a request to an operating system for stored data.
Figure 3:
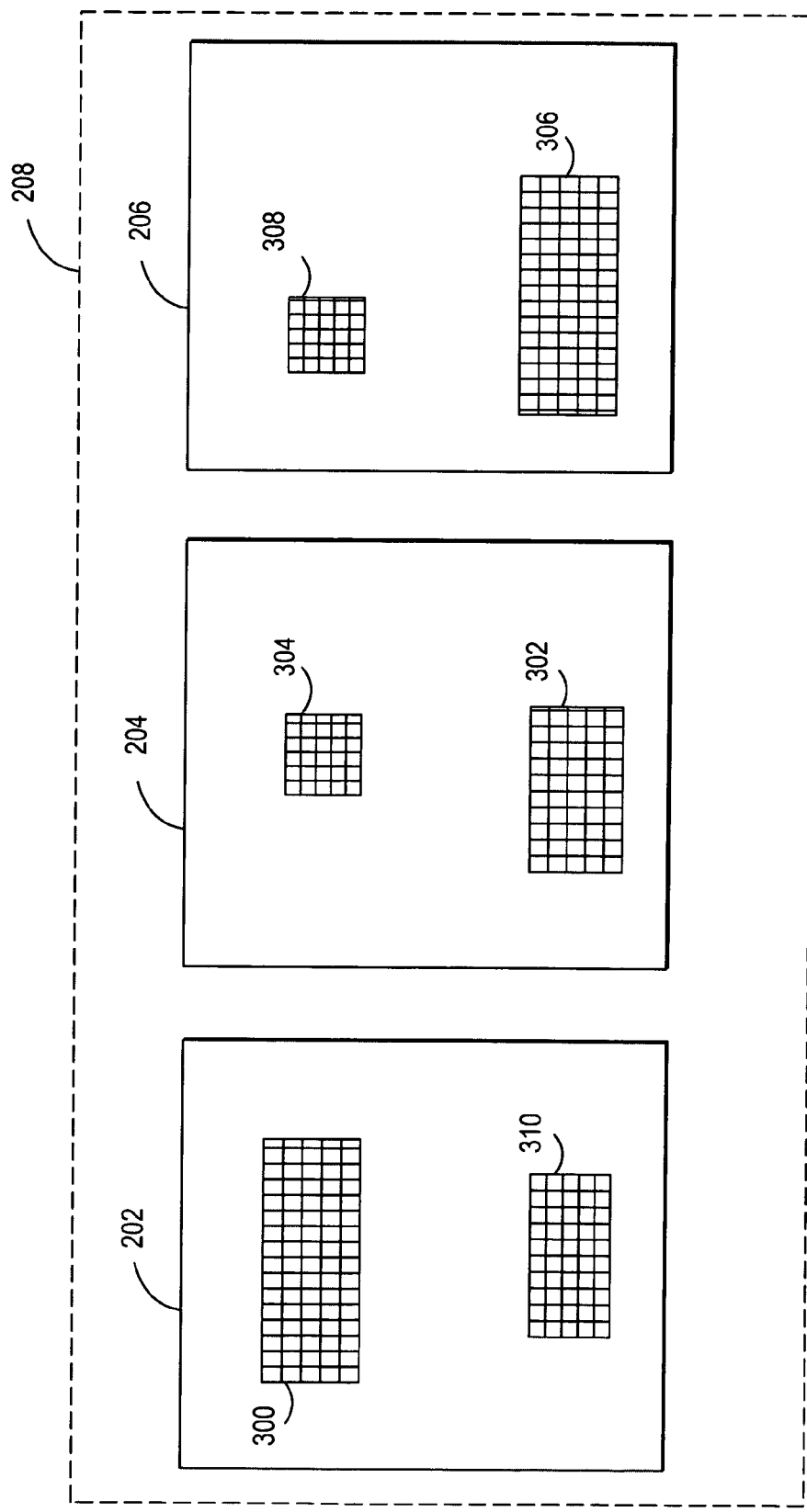
FIG. 3 shows one example of a data file stored as distinct blocks in separate disks.

FIG. 2 of the drawings shows a sequence of operations (or actions) that occurs when the application program 104 sends a request to the operating system 102 for data stored on a disk forming part of the hardware platform 106. Referring to FIG. 2, an application program 104, for example Microsoft Word, sends a request 200 to read stored data in the form of a file, for example, a file called "helloworld.doc." to the operating system 102. For the present purposes, the operating system 102 may be regarded as having an upper part 102A which performs file system functions and a lower part 102B which is responsible for disk management.

In one embodiment, the lower half 102B may operate in accordance with the Redundant Array of Independent Disks (RAID) disk management protocol. Thus, the lower half 102B defines a RAID layer. The RAID layer 102B is possible for managing I/O transactions to a number of independent disks. In the present case, three independent disks 202, 204 and 206 are shown. However, it will be appreciated by those skilled in the art, that in other embodiments, more than three independent disks may be managed by RAID layer 102B. The independent disks 202 to 206 are managed by RAID layer 102B so that from the point of view of the upper half 102A of the operating system 102 which performs the file system functions, the disks 202 to 206 appear as a single logical disk 208. Thus, the upper layer 102A of the operating system 102, upon receipt of the request 200 simply passes the request to RAID layer 102B which then issues, for example multiple I/O requests to the disks 202 to 206 in order to service the request 200. In the present case, it is assumed that data for the file "helloworld.doc" is saved in memory blocks 210, 212 and 214 on disks 202, 204, and 206, respectively. Thus, in order to service the request 200, the RAID layer 102B issues a request 216 to the disk 202 to load the memory block 210 into an associated buffer 222 in Random Access Memory (RAM).

The RAID layer 102B also issues a request 218 to the disk 204 to load the memory block 212 into an associated buffer 224. Finally, the RAID layer 102B issues a request 220 to the disk 206 to load the memory block 214 into an associated buffer 226. Lines 228, 230, and 232, respectively denote the loading of the memory blocks 210, 210, and 214 into the buffers 222, 224, and 226, respectively.

Each of the requests 216, 218, and 220 is managed by an operating system thread initialized by the operating system 102. In particular, the operating system 102 initializes the thread and then goes to "sleep" while the blocks 210, 212, and 214 are being retrieved into the buffers 222, 224, and 226 respectively. The disks 202, 204, and 206 generate interrupts 234, 236, and 238, respectively to the RAID layer 102B, typically, once the blocks 210, 212, and 214, have been, respectively, loaded into buffers 222, 224, and 226. In the prior art, once an interrupt 234, 236, or 238 is received by the RAID layer 102B, the operating system 102 unblocks the thread.

Once the thread is unblocked, the operating system 102 attempts to construct an index of the buffers containing blocks of data associated with the requested file, i.e. "helloworld.doc.", which index is then supplied at 238 to the application program 104 which then uses the index to retrieve an image 240 of the requested file into an application program space 242.

In certain circumstances, it may turn out that the operating system 102 is unblocked by an interrupt, for example, the interrupt 234, associated with the request 216 before data associated with the other requests i.e. the requests 218 and 220, in the thread are loaded. Thus, the interrupt 234 will unblock the thread while the blocks 212 and 214 have not yet been loaded into the buffers 224 and 226, respectively. In this case, the operating system 102 is unable to supply the index to the application program 104, at 238. As a result, the thread gets blocked again until it is unblocked by the interrupts 236 or 238.

As described above, unblocking an operating system has a processing overhead, in that certain registers, caches, etc. have to be saved in order to ensure that when the operating system 102 resumes operation that it functions correctly. Thus, significant performance gains may be obtained if, when the operating system 102 is unblocked, all data necessary for the operating system 102 to complete execution of a thread is available. In the present context, this means that the blocks 210, 212, and 214 are loaded into the buffers 222, 224, and 226, respectively, before the operating system 102 is unblocked.

Aspects of the techniques presented herein include a method for unblocking the operating system 102 based on a control criterion or condition which statistically makes it highly likely that when the operating system 102 is unblocked, all data needed for the operating system 102 in order to complete execution of the thread is available.

The control condition is based on the request 200 and on a nature of the data being requested by the request 200. If the data that is being requested has been stored sequentially, for example, as is the case with large data files, or pertains to a database index read, or a web page download, then the control condition causes the operating system 102 to be unblocked only when the last block of data in the sequential block of data has been loaded into its associated buffer. Thus, in the case of the example shown in FIG. 2, if the requested data block comprises the blocks 210, 212 and 214, then the last block of data is the block 214, and the operating system 102 will be unblocked only when the block 214 has been loaded into its associated buffer 226. Therefore, the interrupts 234 and 236 will be ignored, and only the interrupt 238 will be allowed to unblock the operating system 102. In this way, because the data has been sequentially stored, it is virtually guaranteed that when the interrupt 238 unblocks the operating system 102, the blocks 210 and 212 would already have been loaded into the buffers 222 and 224, respectively. Accordingly, the operating system 102, when unblocked by the interrupt 238, will be able to complete compilation of the file index which is then send to the application program 104 at block 238.

Figure 4:
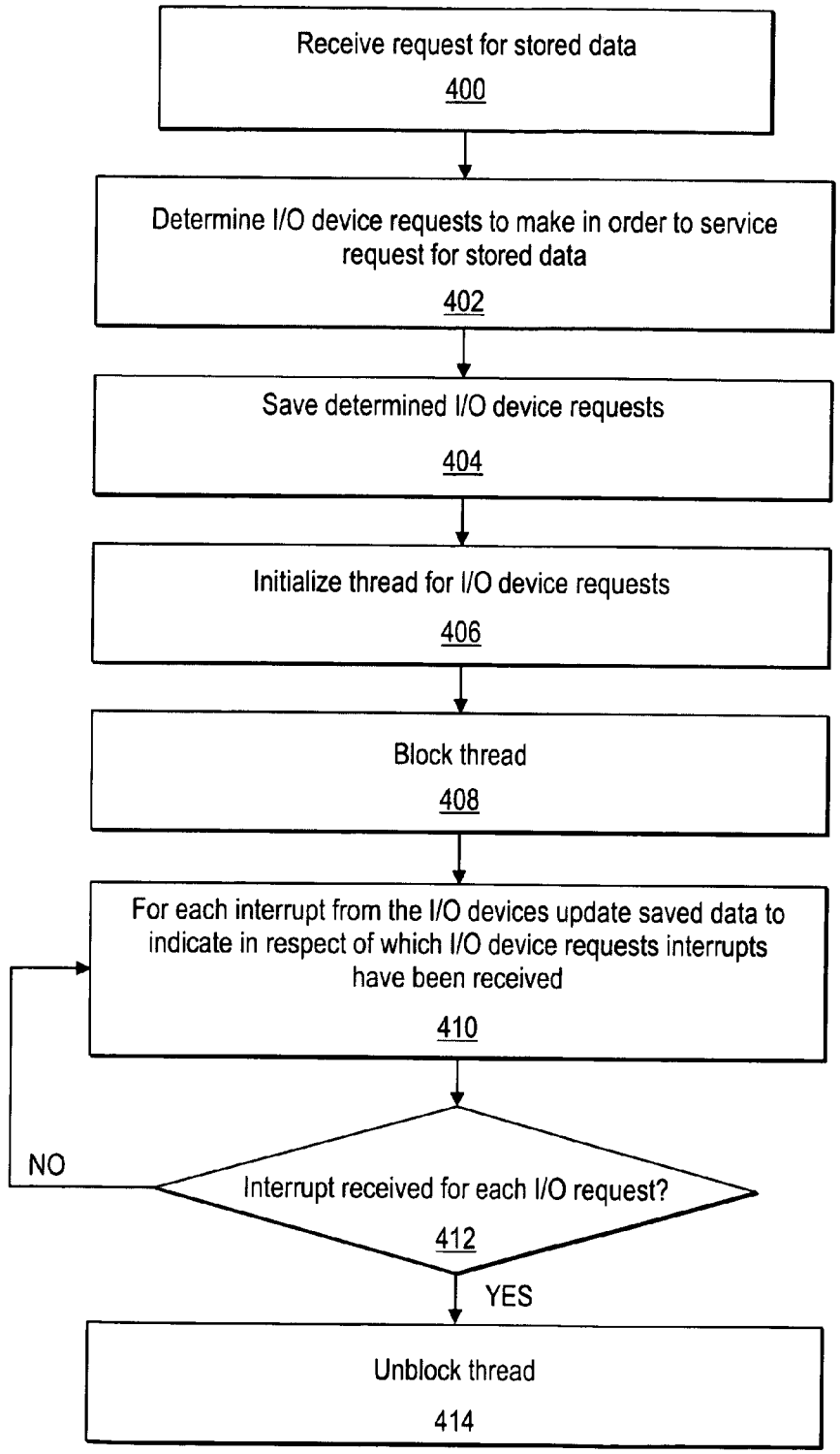
FIG. 4 shows a flow chart of operations performed by an operating system in order to service an I/O device request.

FIG. 4 of the drawings shows a flowchart of operations performed in accordance with one embodiment of the invention. Referring to FIG. 4, at 400, the operating system 102 receives a request for stored data. At 402, the operating system 102 determines what I/O device requests to make in order to service the request for stored data. For example, as illustrated in FIG. 2, the request 200 is for a data file "helloworld.doc". This request 200 is received by the operating system 102 which in turn determines that the I/O device requests 216, 218, and 220 need to be made in order to retrieve the stored data associated with the file "helloworld.doc". At 404, the operating system 102 saves the determined I/O requests. At 408, the operating system issues I/O device requests. At 408, the operating system blocks the thread. In the case of the present invention, 408 is executed by blocking on the last I/O device request, which in the case of FIG. 2, is the request 220 to the disk 206.

At 410, for each interrupt from the I/O devices, the operating system 102 updates saved data to indicate in respect of which I/O device requests interrupts have been received. At 412, it is determined if an interrupt has been received for each I/O request. If there are interrupts outstanding for some I/O requests then 410 is re-executed, otherwise at 414, the thread is unblocked.

Execution of 410 and 412 ensure that the operating system 102 is unblocked only if an interrupt associated with the last I/O device request is received. It will be appreciated that if the data being requested has been stored in sequential data blocks then unblocking only on interrupts associated with the last data block of the sequential data blocks virtually guarantees that all other blocks of data associated with requested data block would have been loaded and available to the operating system 102.

Figure 5:
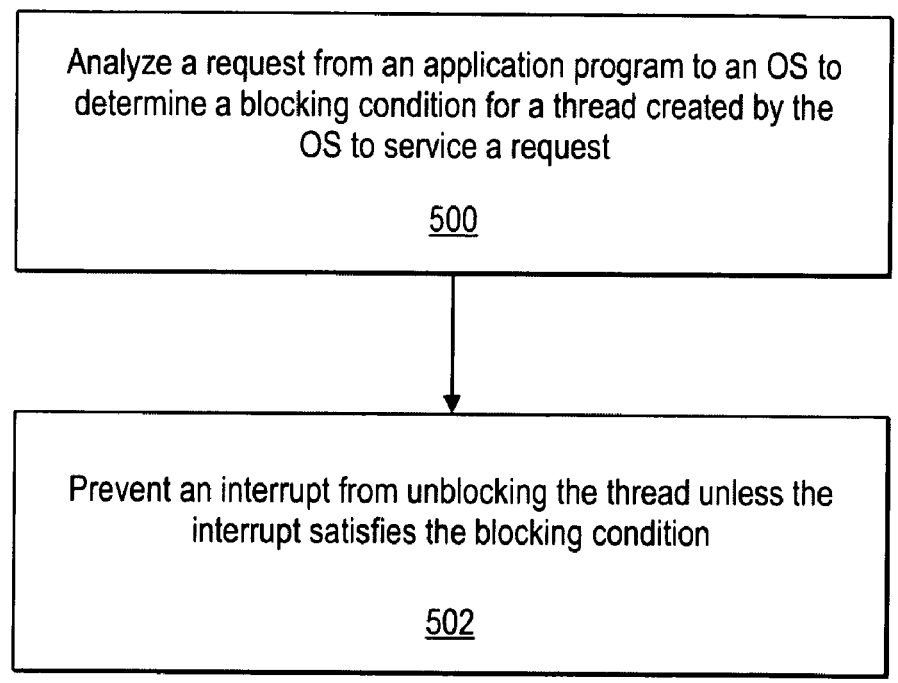
FIG. 5 shows a flow chart of operations performed when handling interrupts in accordance with one embodiment of the invention.

FIG. 5 shows a flowchart of operations performed when handling interrupts in accordance with another embodiment of the invention. Referring to FIG. 5, at 500 the operating system 102 analyzes a request from an application program 104 to determine a control condition for a thread created by the operating system 102 to service a request for data. At 502, the operating system 102 prevents an interrupt from unblocking a thread unless the interrupt satisfies the control condition. As has been noted above, the control condition is based on the nature of the data being requested and statistically guarantees that upon satisfaction of the control condition all other blocks of data would have been loaded so that the unblocked thread may complete execution. In the case of sequentially stored data, the control condition includes whether a last block of data associated with a request for data stored as a sequential block has been loaded into its associated buffer.

Figure 6:
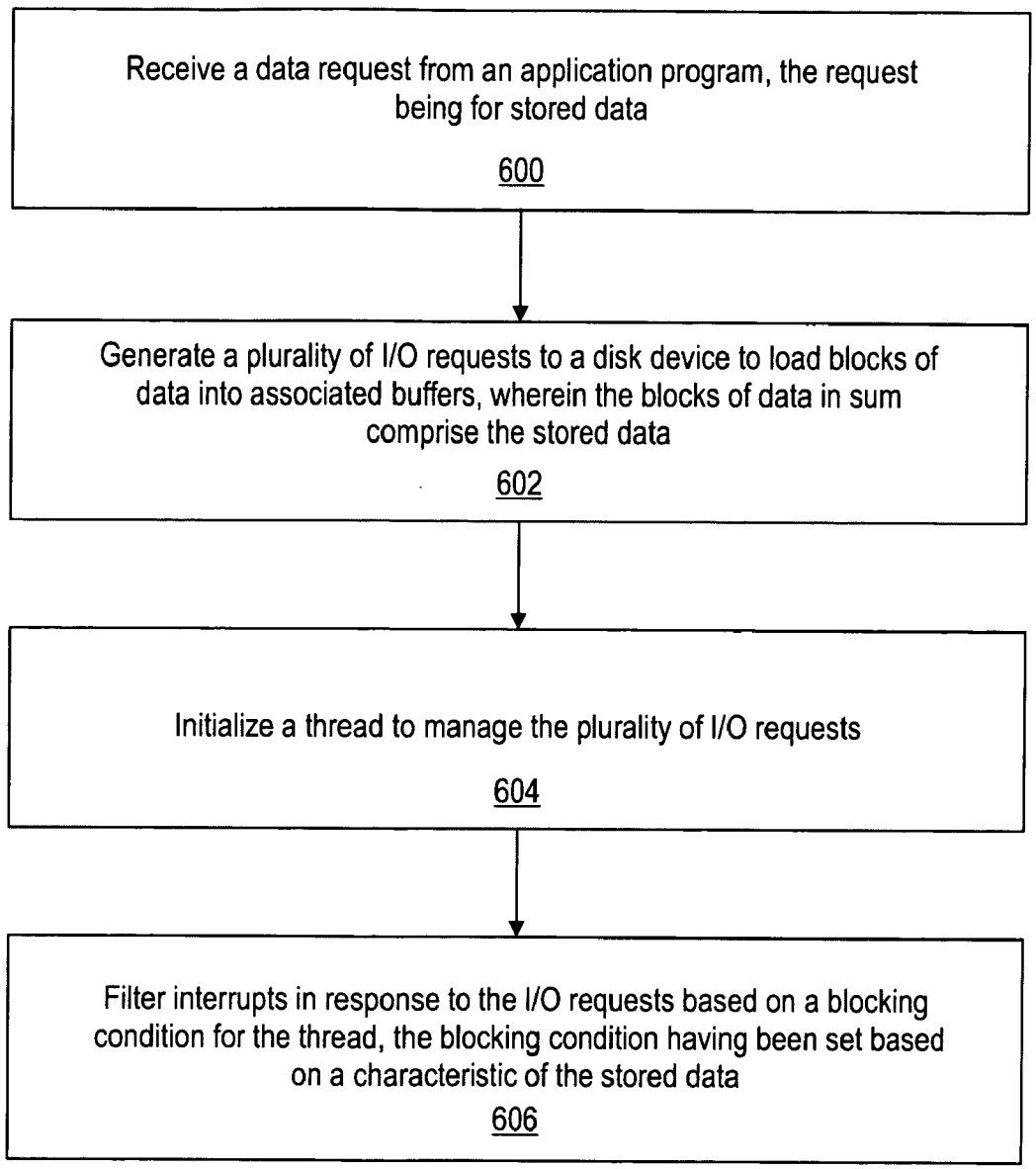
FIG. 6 shows a flow chart of operations performed when handling interrupts in accordance with another embodiment of the invention.

FIG. 6 of the drawings shows yet another embodiment of handling interrupts in accordance with the present invention. Referring to FIG. 6, at 600, the operating system 102 receives a data request from the application program 104, the request being for stored data e.g. a data file "helloworld.doc". At 602, the operating system 102 generates a plurality of I/O requests to a disk device to load blocks of data into associated buffers, wherein the blocks of data in sum comprise the stored data. For example, in response to the request 200 for the file "helloworld.doc", the RAID layer 102B generates I/O the requests 216 to 220 to load the blocks 210 to 214, respectively, into buffers the 224 to 226, respectively.

At 604, the operating system 102 blocks. At 606, an interrupt handler within the operating system 102 filters interrupts in response to the I/O request based on a control condition for the thread. The control condition is set based on a characteristic of the stored data. In one embodiment, if the data is stored sequentially, then the blocking condition includes whether a last block of data in the sequential block has been loaded.

Figure 7:
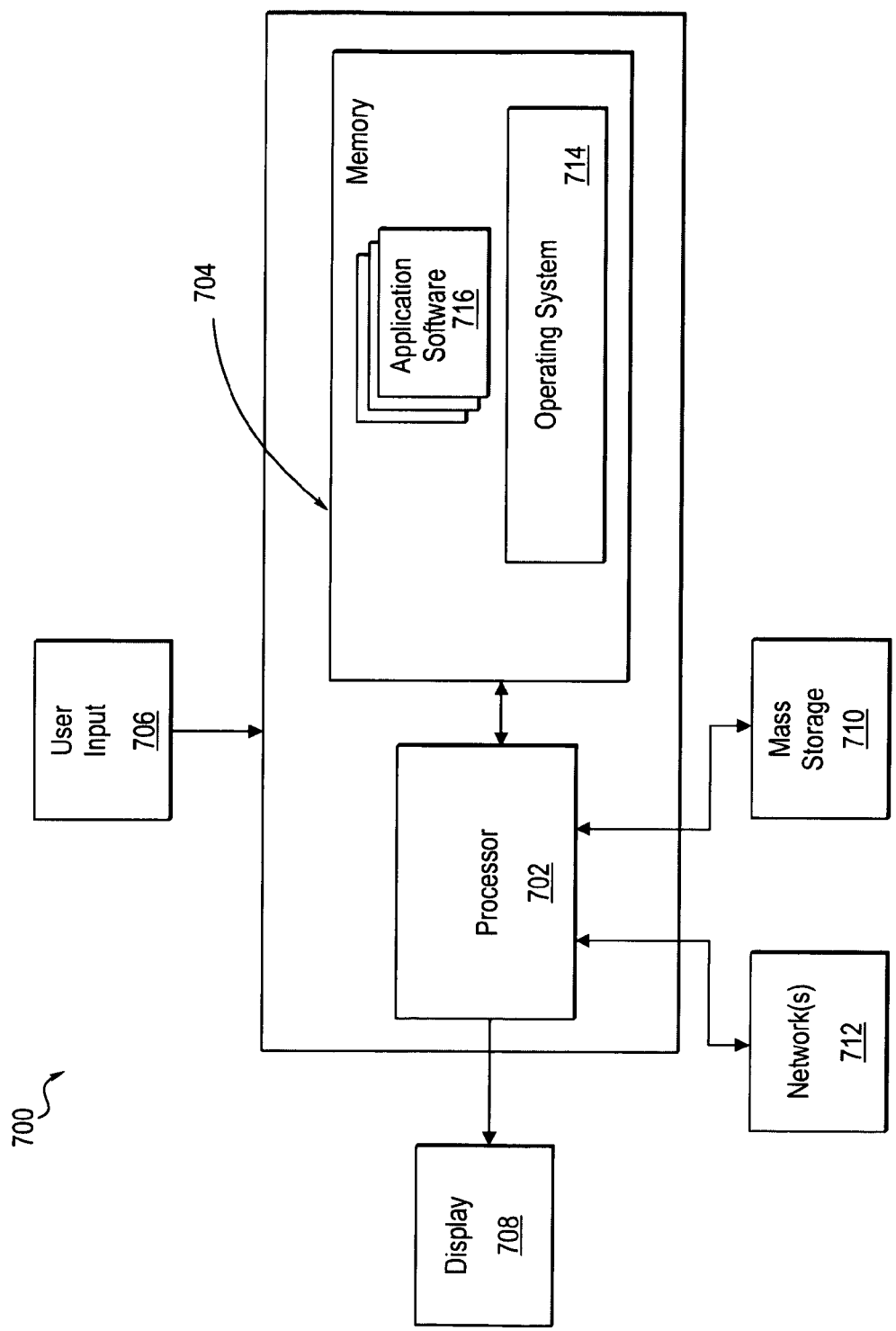
FIG. 7 shows a block diagram of a processing system in accordance of one embodiment of the invention.

FIG. 7 of the drawings shows a high-level block diagram of a system 700, which comprises an operating system 714 that handles interrupts in accordance with the techniques disclosed herein. The processing system 700 includes at least one processor 702 coupled to a memory 704. The processor 702 may represent one or more processors (e.g. microprocessors), and the memory 704 may represent random access memory (RAM) devices comprising a main storage of the system 700, as well as any supplemental levels of memory e.g., cache memories, non-volatile or back-up memories (e.g. programmable or flash memories), read-only memories, etc. In addition, the memory 704 may be considered to include memory storage physically located elsewhere in the system 700, e.g. any cache memory in a processor the 702, as well as any storage capacity used as a virtual memory, e.g., as stored on a mass storage device 710 or on another computer coupled to the system 700 via network 712.

The processing system 700 also typically receives a number of inputs and outputs for communicating information externally. For interface with a user or operator, the system 700 typically includes one or more user input devices 706 (e.g., a keyboard, a mouse, etc.) and a display 708 (e.g., a CRT monitor, a LCD panel). However, with some implementations of the system 700, direct local user input and output may not be required, such that the user input devices 706 and the display 708 may be omitted.

For additional storage, the system 700 may also include one or more mass storage devices 710, e.g., a floppy or other removable disk drive, a hard disk drive, a Direct Access Storage Device (DASD), an optical drive (e.g. a CD drive, a DVD drive, etc.) and/or a tape drive, among others. Furthermore, the system 700 may include an interface with one or more networks 712 (e.g., a land, a WAN, a wireless network, and/or the Internet among others) to permit the communication of information with other computers coupled to the networks. It should be appreciated that the system 700 typically includes suitable analog and/or digital interfaces between the processor 702 and each of the components 704, 706, 708 and 712 as is well known in the art.

The processing system 700 operates under the control of an operating system 714, and executes various computer software applications, components, programs, objects, modules, etc. (e.g. a program or module which performs operations as shown in FIG. 4 of the drawings). Moreover, various applications, components, programs, objects, etc. may also execute on one or more processors in another computer coupled to the system 700 via the network 712, e.g. in a distributed computing environment, whereby the processing required to implement the functions of a computer program may be allocated to multiple computers over a network.

FIG. 8 of the drawings shows components of the operating system 714 of system 700 in greater detail. Referring to FIG. 8, the operating system 714 includes a mechanism 800 to receive the data request from an application program, the request being for stored data. The operating system 714 includes a mechanism 802 to generate a plurality of I/O request to a disk device to load blocks of data into associated buffers, wherein the blocks of data in sum comprise the stored data. The operating system 714 also includes a mechanism 804 to filter interrupts in response to the I/O requests based on a control condition for the thread, the control condition having been set based on a characteristic of the stored data.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for handling interrupts, the method comprising:

analyzing a request from an application program to an operating system to determine a control condition for a thread created by the operating system to service the request; and preventing an interrupt from unblocking the thread unless the interrupt satisfies the control condition, wherein unblocking the thread comprises restoring a stack and a program counter of the thread to corresponding values saved when the thread was blocked.

2. The method of claim 1, wherein the request comprises an input/output (I/O) request for a file from a hardware device.

3. The method of claim 2, wherein the control condition includes a condition that only interrupts related to a state of loading a defined data block from the hardware device are allowed to unblock the thread.

4. The method of claim 3, wherein the defined data block is a last data block for the file.

5. The method of claim 4, wherein preventing the interrupt comprises configuring a handler to filter interrupts to the operating system based on the control condition.

6. A method for handling interrupts, the method comprising:
- receiving a data request from an application program, the request being for stored data;
- generating a plurality of input/output (I/O) requests to a hardware device to load blocks of data into associated buffers, wherein the blocks of data in sum comprise the stored data; and
- filtering interrupts in response to the input/output (I/O) requests based on a control condition for a thread generated to handle the plurality of input/output (I/O) requests, the control condition having been set based on a characteristic of the stored data, wherein said filtering interrupts comprises preventing an interrupt from unblocking the thread unless the interrupt satisfies the control condition, wherein unblocking the thread comprises restoring a stack and a program counter of the thread to corresponding values saved when the thread was blocked.

7. The method of claim 6 further comprising setting the control condition.

8. The method of claim 7, wherein setting the control condition comprises, in the case of the stored data having a high likelihood of being stored as a sequential block, setting a condition that an operating system unblocks the thread only on interrupts relating to an input/output (I/O) request for a last block of data from the sequential block.

9. The method of claim 8, wherein a likelihood of the stored data being stored as a sequential block is high if the data request is selected from the group consisting of data requests for data from web servers, and database index reads.

10. A computer-readable medium having stored thereon a sequence of instructions which when executed by a computer cause the computer to perform a method for handling interrupts, the method comprising:
- analyzing a request from an application program to an operating system to determine a control condition for a thread created by the operating system to service the request; and
- preventing an interrupt from unblocking the thread unless the interrupt satisfies the control condition, wherein unblocking the thread comprises restoring a stack and a program counter of the thread to corresponding values saved when the thread was blocked.

11. The computer-readable medium of claim 10, wherein the request comprises an input/output (I/O) request for a file from a hardware device.

12. The method of claim 11, wherein the control condition specifies that only interrupts relating to a state of loading a defined data block from the hardware device are allowed to unblock the thread.

13. A computer-readable medium having stored thereon a sequence of instructions which when executed by a computer, cause the computer to perform a method for handling interrupts, the method comprising:
- receiving a data request from an application program, the request being for stored data;
- generating a plurality of input/output (I/O) requests to a hardware device to load blocks of data into associated buffers, wherein the blocks of data in sum comprise the stored data; and
- filtering interrupts in response to the input/output (I/O) requests based on a control condition for a thread generated to handle the plurality of input/output (I/O) requests, the control condition having been set based on a characteristic of the stored data, wherein said filtering interrupts comprises preventing an interrupt from unblocking the thread unless the interrupt satisfies the control condition, wherein unblocking the thread comprises restoring a stack and a program counter of the thread to corresponding values saved when the thread was blocked.

14. The computer-readable medium of claim 13, further comprising setting the control condition.

15. The computer-readable medium of claim 14, wherein setting the control condition comprises, in the case of the stored data having a high likelihood of being stored as a sequential block, setting a condition that an operating system unblocks the thread on interrupts relating to an input/output (I/O) request for a last block of data from the sequential block.

16. The method of claim 15, wherein a likelihood of the stored data being stored as a sequential block is high if the data request is selected from the group consisting of data requests for data from web servers, and database index reads.

17. A processing system comprising:
- a processor;
- a memory coupled to the processor, the memory storing instructions which when executed by the processor causes the processor to perform a method comprising:
- receiving a data request for an application program, the request being for stored data;
- generating a plurality of input/output (I/O) requests to a hardware device to load blocks of data into associated buffers, wherein the blocks of data in sum comprise the stored data; and
- filtering interrupts in response to the input/output (I/O) requests based on a control condition for a thread generated to handle the plurality of input/output (I/O) requests, the control condition having been set based on the application request and a characteristic of the stored data, wherein said filtering interrupts comprises preventing an interrupt from unblocking the thread unless the interrupt satisfies the control condition, wherein unblocking the thread comprises restoring a stack and a program counter of the thread to corresponding values saved when the thread was blocked.

18. The processing system of claim 17, wherein the control condition, in the case of the stored data having a high likelihood of being stored as a sequential block, comprises a condition that the operating system unblocks the thread on an input/output (I/O) request for a last block of data from the sequential block.

19. The method of claim 18, wherein a likelihood of the stored data being stored as a sequential block is high if the data request is selected from the group consisting of data requests for data from web servers, and data block index reads.

20. A system comprising:
- an application program;
- an operating system; and
- a hardware platform, wherein the operating system receives a data request from the application program, the data request being for stored data; generates a plurality of input/output (I/O) requests to a hardware device to load blocks of the stored data into associated buffers, and filters interrupts in response to the input/output (I/O) requests based on a blocking condition for a thread generated to handle the plurality of input/output (I/O) requests, the blocking condition having been set based on a characteristic of the stored data, wherein said filtering interrupts comprises preventing an interrupt from unblocking the thread unless the interrupt satisfies the blocking condition, wherein unblocking the thread comprises restoring a stack and a program counter of the thread to corresponding values saved when the thread was blocked.

21. A processing system comprising:

means for receiving a data request from an application program, the request being for stored data;

means for generating a plurality of input/output (I/O) requests to a hardware device to load blocks of data into associated buffers, wherein the blocks of data in sum comprise the stored data; and means for filtering interruption in response to the input/output (I/O) requests based on a control condition for a thread generated to handle the plurality of input/output (I/O) requests, the control condition having been set based on the application request and a characteristic of the stored data, wherein said filtering interrupts comprises preventing an interrupt from unblocking the thread unless the interrupt satisfies the control condition, wherein unblocking the thread comprises restoring a stack and a program counter of the thread to corresponding values saved when the thread was blocked.

* * * * *